US011695132B2

(12) United States Patent
Cauchi et al.

(10) Patent No.: US 11,695,132 B2
(45) Date of Patent: *Jul. 4, 2023

(54) METHOD FOR CONTROLLING AIR FLOW IN A FUEL CELL POWER SYSTEM

(71) Applicant: Nuvera Fuel Cells, LLC, Billerica, MA (US)

(72) Inventors: Marco Cauchi, Milan (IT); Marco Spataro, Varese (IT)

(73) Assignee: Nuvera Fuel Cells, LLC, Billerica, MA (US)

( * ) Notice: Subject to any disclaimer, the term of this patent is extended or adjusted under 35 U.S.C. 154(b) by 376 days.

This patent is subject to a terminal disclaimer.

(21) Appl. No.: 16/017,677

(22) Filed: Jun. 25, 2018

(65) Prior Publication Data
US 2018/0309144 A1    Oct. 25, 2018

Related U.S. Application Data

(63) Continuation of application No. 14/317,022, filed on Jun. 27, 2014, now Pat. No. 10,033,055.
(Continued)

(51) Int. Cl.
*H01M 8/04*        (2016.01)
*H01M 8/04089*     (2016.01)
(Continued)

(52) U.S. Cl.
CPC ..... *H01M 8/04104* (2013.01); *H01M 8/0441* (2013.01); *H01M 8/04395* (2013.01);
(Continued)

(58) Field of Classification Search
CPC ......... H01M 4/04104; H01M 4/04395; H01M 4/0441; H01M 4/04432; H01M 4/04753;
(Continued)

(56) References Cited

U.S. PATENT DOCUMENTS 5,771,476 A * 6/1998 Mufford .................. B60L 58/30
701/22
5,991,670 A    11/1999 Mufford et al.
(Continued)

FOREIGN PATENT DOCUMENTS

CN    102 520 613 A    6/2012
JP    S62-082659 A     4/1987
(Continued)

OTHER PUBLICATIONS

Examination Report issued by Australian Patent Office for AU Application No. 2014302194, dated Aug. 13, 2018 (3 pages).
(Continued)

*Primary Examiner* — Jimmy Vo
(74) *Attorney, Agent, or Firm* — Finnegan, Henderson, Farabow, Garrett & Dunner, LLP

(57) ABSTRACT

One aspect of the present disclosure is directed to a fuel cell power system. The system may include one or more fuel cells configured to generate electric power and a compressor configured to supply compressed air to the one or more fuel cells. The system may further include one or more sensors. The sensors may be configured to generate a signal indicative of at least one measured parameter of air flow across the one or more fuel cells. The system may also include a controller in communication with the one or more fuel cells, the compressor, and the sensors. The controller may be configured to determine a desired pressure drop based on at least one calculated parameter, determine a control command for the compressor based on the desired pressure drop, and adjust the control command based on a feedback gain parameter and a feed forward gain parameter.

10 Claims, 4 Drawing Sheets

Related U.S. Application Data

(60) Provisional application No. 61/840,862, filed on Jun. 28, 2013.

(51) Int. Cl.
    *H01M 8/04746*     (2016.01)
    *H01M 8/0438*     (2016.01)
    *H01M 8/04858*     (2016.01)
    *H01M 8/04992*     (2016.01)

(52) U.S. Cl.
    CPC ... *H01M 8/04432* (2013.01); *H01M 8/04753* (2013.01); *H01M 8/04776* (2013.01); *H01M 8/04783* (2013.01); *H01M 8/04947* (2013.01); *H01M 8/04992* (2013.01)

(58) Field of Classification Search
    CPC ......... H01M 4/04776; H01M 4/04783; H01M 4/0497; H01M 4/04992
    See application file for complete search history.

(56) References Cited

U.S. PATENT DOCUMENTS

| | | |
|---|---|---|
| 2004/0202917 A1 | 10/2004 | Chapman et al. |
| 2005/0255366 A1* | 11/2005 | Tighe ................ H01M 8/04156 429/447 |
| 2005/0260463 A1* | 11/2005 | Chapman .......... H01M 8/04619 429/432 |
| 2007/0264546 A1 | 11/2007 | LaVen |
| 2008/0081225 A1 | 4/2008 | Arthur et al. |
| 2010/0112385 A1 | 5/2010 | Kirklin |
| 2010/0255397 A1 | 10/2010 | Ishikawa |
| 2010/0316926 A1 | 12/2010 | Ishikawa et al. |

FOREIGN PATENT DOCUMENTS

| | | |
|---|---|---|
| JP | H03-108268 A | 5/1991 |
| JP | 2004-095226 A | 3/2004 |
| JP | 2008-166019 A | 7/2008 |

OTHER PUBLICATIONS

Examination Report issued by Australian Patent Office for AU Application No. 2014302194, dated Nov. 24, 2017 (3 pages).

Examination Report issued by European Patent Office for EP Application No. 14742653.0, dated Sep. 20, 2017 (5 pages).

International Search Report and Written Opinion issued in counterpart Application No. PCT/US2014/044584 dated Sep. 4, 2014 (10 pages).

Official Action issued by Japanese Patent Office for JP Application No. 2016-534243, dated Mar. 19, 2018 (8 pages).

* cited by examiner

METHOD FOR CONTROLLING AIR FLOW IN A FUEL CELL POWER SYSTEM

This application is a continuation of U.S. patent application Ser. No. 14/317,022, filed Jun. 27, 2014, which claims the benefit of priority to U.S. Provisional Application No. 61/840,862, filed Jun. 28, 2013, which are both incorporated herein by reference in their entirety.

The present disclosure relates to a fuel cell power system. In some embodiments, the fuel cell power system described herein includes a controller configured to control air flow to one or more fuel cells of the fuel cell power system.

Fuel cell power systems have been proposed as a clean, efficient, and environmentally responsible power source for both stationary and automotive applications. A fuel cell power system can include a fuel stack having one or more fuel cells for generating electric power. In particular, each fuel cell can include an anode in an anode compartment, a cathode in a cathode compartment, and an electrolyte that allows charges to move between the anode and cathode. In some examples, a flow of fuel is supplied to the anode, and a flow of oxygen containing gas (e.g., air) is fed to the cathode. The fuel can be catalytically disassociated in the anode to generate free protons and electrons. The protons can pass through the electrolyte to the cathode and react with the oxygen and the electrons in the cathode to generate water. The electrons can be drawn from the anode to the cathode through an electric load circuit, producing electricity.

The fuel cell stack typically receives oxygen for the cathode from charged air provided by an air compressor. In certain fuel cell power systems, a controller may be provided for controlling the air flow rate through the fuel cell stack to vary the electrical output. Where an adjustment in the electrical output is required, the controller may be configured to send a command signal to the air compressor to change the air flow rate across through the fuel cell stack. The controller may also measure the air flow rate by measuring a pressure drop across the fuel cell stack and determine a difference between the measured pressure drop and a desired pressure drop across the fuel cell stack. The controller may then be configured to minimize any difference between the measured air flow rate and the desired air flow rate by adjusting the speed of the air compressor.

In some circumstances, the controller may be required to quickly adjust the speed of the air compressor in response to fluctuations in the demand for electricity. The dynamic response may result in unwanted noise in the signal from pressure sensors measuring the actual pressure drop across the fuel cell stack, which may then reflect in the command signal to the motor of the air compressor. Such signals may cause excessive revving of the air compressor generating an undesirable sound. Further, such signals may cause a shortage in compressor lifetime.

In consideration of the aforementioned circumstances, the present disclosure provides a fuel cell power system having a controller configured to control air flow to one or more fuel cells of the fuel cell power system. The controller may be configured adjust the command signal to the compressor to provide a fast dynamic response while reducing the overall noise of the air compressor.

One aspect of the present disclosure is directed to a fuel cell power system. The fuel cell power system may include one or more fuel cells configured to generate electric power and a compressor configured to supply compressed air to the one or more fuel cells. The fuel cell power system may further include one or more sensors associated with the one or more fuel cells. The one or more sensors may be configured to generate a signal indicative of at least one measured parameter of air flow across the one or more fuel cells. The fuel cell power system may also include a controller in communication with the one or more fuel cells, the compressor, and the one or more sensors. The controller may be configured to determine a desired pressure drop across the one or more fuel cells based on at least one calculated parameter, determine a control command for the compressor based on the desired pressure drop, and adjust the control command based on a feedback gain parameter and a feed forward gain parameter.

Another aspect of the present disclosure is directed to a method for controlling air flow in one or more fuel cells of a fuel cell power system. The method may include supplying a pressurized air stream from a compressor to the one or more fuel cells. The method may further include determining a desired pressure drop across the one or more fuel cells based on at least one calculated parameter, determining a control command for a compressor based on the desired pressure drop, and adjusting the control command based on a feedback gain parameter and a feedforward gain parameter.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the systems and methods, as claimed.

The accompanying drawings, which are incorporated in and constitute a part of this specification, illustrate embodiments of the disclosure and together with the description, serve to explain the principles of the disclosure. Wherever possible, the same reference numbers will be used throughout the drawings to refer to the same or like parts.

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
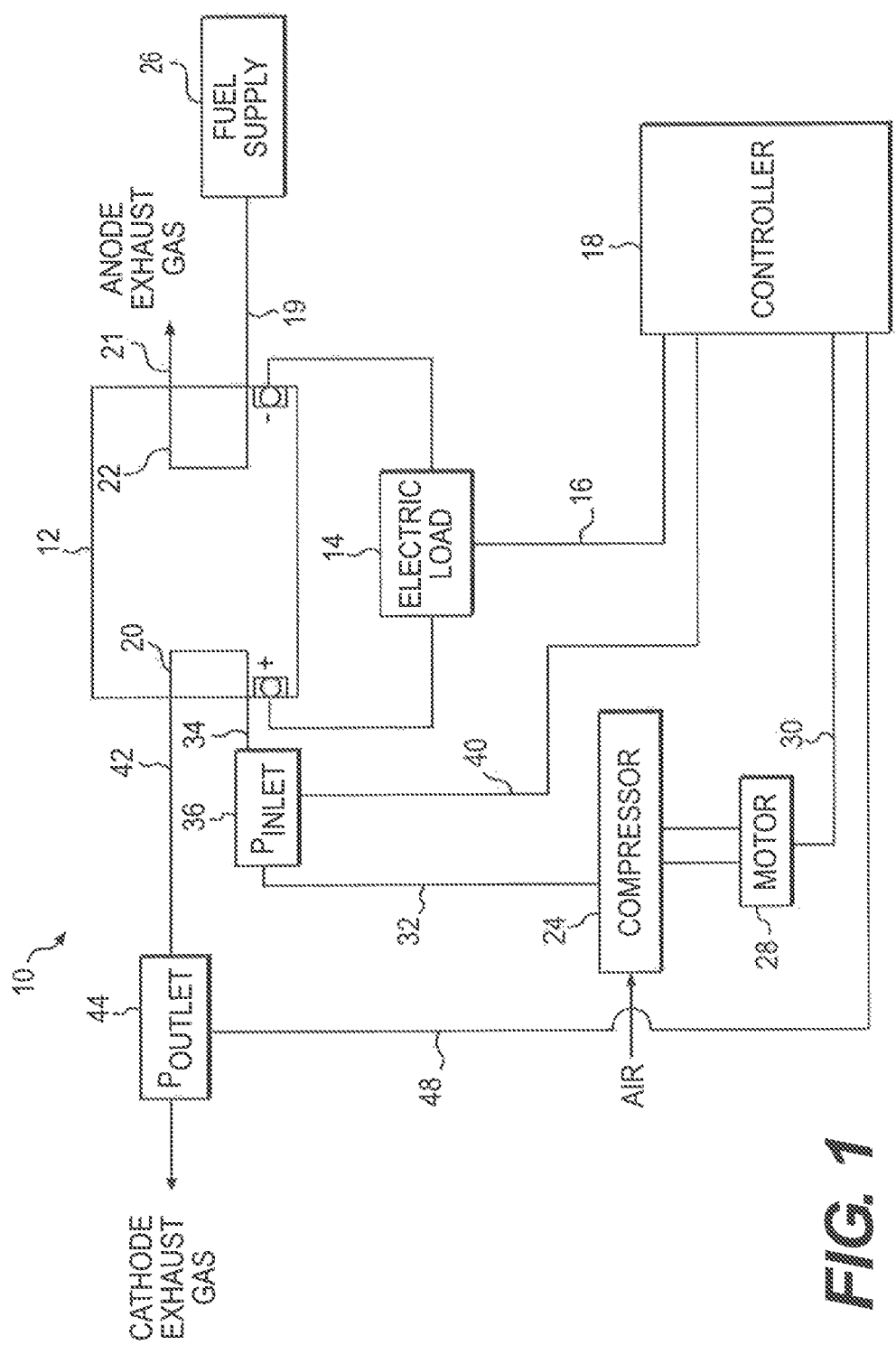
FIG. 1 is a block diagram of a fuel cell power system, according to an exemplary disclosed embodiment.

FIG. 1 illustrates an exemplary fuel cell power system 10 and related components. The exemplary fuel cell power system 10 may be configured to generate electric power for automotive, portable, and industrial applications. In the exemplary embodiment, the components of fuel cell power system 10 include a fuel cell stack 12, an air compressor 24, and a fuel supply 26.

Fuel cell stack 12 may include one or more fuel cells. The one or more fuel cells may be connected electrically in series and/or in parallel in a manner commonly known in the art. A schematic representation of fuel cell stack 12 is shown in FIG. 1, with the anode side of fuel cell stack 12 designated with the reference numeral 22 and the cathode side of fuel cell stack 12 being designated with reference numeral 20. The fuel cell stack 12 further includes an anode inlet 19, an anode outlet 21, a cathode inlet 34, and a cathode outlet 42.

As shown in FIG. 1, the anode inlet 21 is in fluid communication with fuel supply 26 and the cathode inlet 34 is in fluid communication with compressor 24. Compressor 24 may be any known compressor in the art. Compressor 24 is configured to provide charged air to cathode inlet 34 of the fuel cell stack 12 via line 32. The air may be drawn from the atmosphere, typically though a filter (not shown) to compressor 24. Compressor 24 may be electrically or mechanically coupled to motor 28 to drive compressor 24 at a speed sufficient to provide a desired quantity of charged air to cathode side 20.

As explained above, a chemical reaction may occur in fuel cell stack 12 to produce electric power. In particular, the fuel supplied to anode side 22 may be catalytically disassociated in anode side 22 to generate free protons and electrons. The protons may pass through an electrolyte (not shown) to cathode side 20 and react with the oxygen and the electrons in the cathodes to generate water. The electrons can be drawn from the anodes to the cathodes outputting a current to electric load 14. Excess fuel may be removed from fuel cell stack 12 via anode outlet 21, and excess air may be removed from fuel cell stack 12 via cathode outlet 42.

Fuel cell power system 10 may include components that together are configured to control air flow through fuel cell stack 12, by regulating the speed of compressor 24. In particular, fuel cell power system 10 may include one or more sensors and a controller 18 in communication with the fuel cell stack 12, the one or more sensors, and motor 28 driving compressor 24. Each of the one or more sensors may be configured to detect and/or measure at least one operational aspect associated with fuel cell power system 10. Based on the inputs from the fuel cell stack 12 and the one or more sensors, controller 18 may regulate air flow through the fuel cell stack by varying the speed of compressor 24.

As shown in FIG. 1, the one or more sensors include a cathode inlet air pressure sensor 36 positioned adjacent cathode inlet 34 and a cathode outlet air pressure sensor 44 positioned adjacent cathode outlet 42. The cathode inlet pressure sensor 36 and the cathode outlet pressure sensor 44 may be pressure transducers configured to measure the air pressure at cathode inlet 34 and air pressure at cathode outlet 42 of fuel cell stack 12, respectively. It will be understood that other sensors may be employed to directly or indirectly measure the air-flow through fuel cell stack 12. The cathode inlet pressure sensor 36 is in communication with controller 18 via line 40 and the cathode outlet pressure sensor 44 is in communication with controller 18 via line 48. Each of these sensors may generate signals directed to controller 18 via lines 40 and 48 for further processing.

Controller 18 may embody, for example, one or more general microprocessors capable of controlling numerous functions of fuel cell power system 10. Controller 18 may include a memory, a secondary storage device, a processor (e.g., a CPU), or any other components for executing programs to perform the disclosed functions of fuel cell power system 10. Various other circuits may be associated with controller 18, such as power supply circuitry, signal conditioning circuitry, data acquisition circuitry, signal output circuitry, signal amplification circuitry, and other types of circuitry known in the art.

Controller 18 may be configured to initiate, monitor, and adjust the speed of compressor 24. In particular, controller 18 may be configured to receive inputs from sensors 36, 44. In addition, controller 18 may be in communication with fuel cell stack 12 via electric load 14. Controller 18 may be configured to receive a signal via line 16 indicative of a power demand by electric load 14. In response to fluctuations in the demand by electric load 14, controller 18 may be configured to send a command signal to motor 28 of compressor 24 to adjust the speed of compressor 24. In this manner, controller 18 may regulate air flow through the fuel cell stack, based on the speed of compressor 24.

Figure 2:
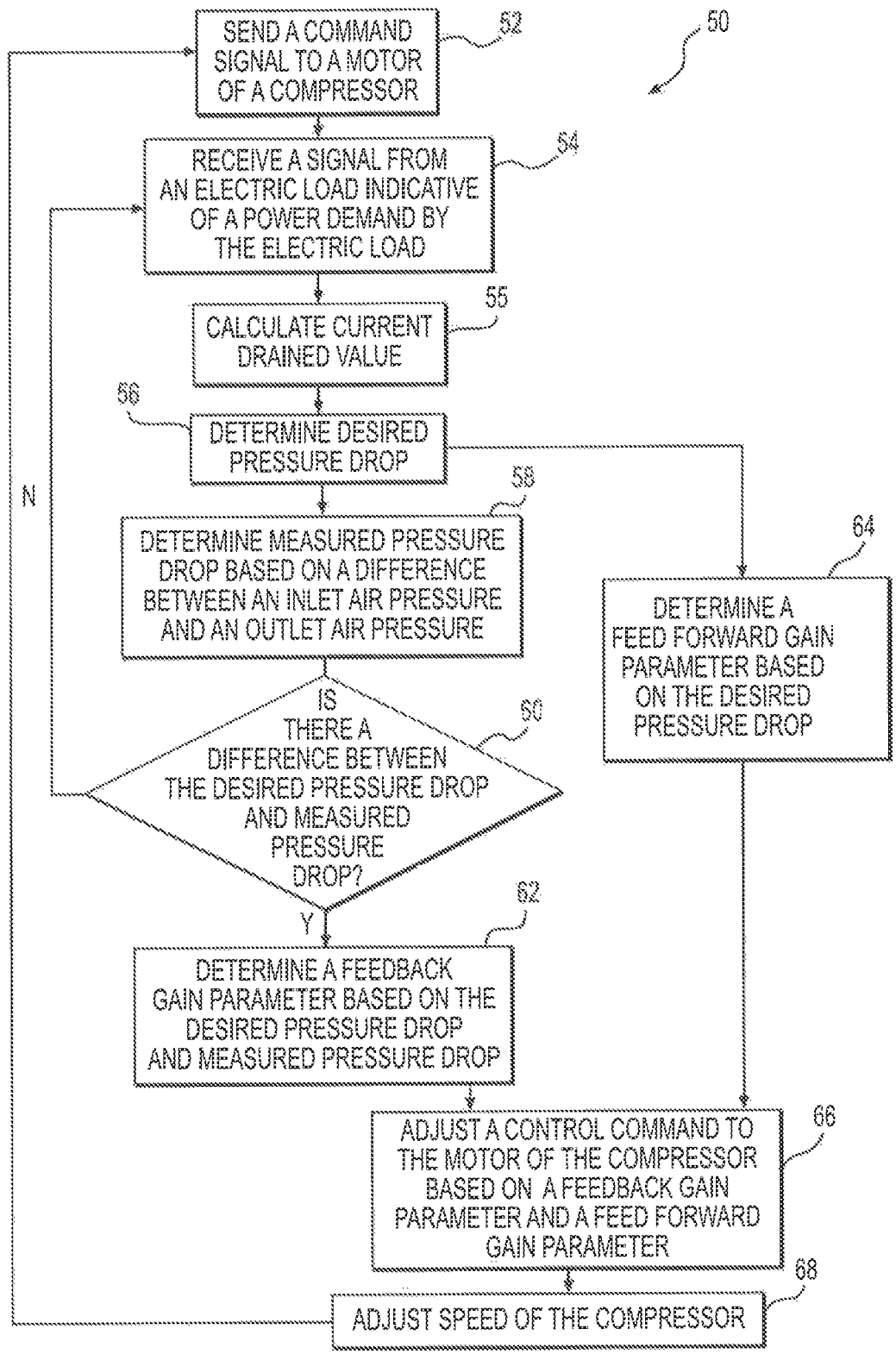
FIG. 2 is a flow chart of a method of controlling air flow to a fuel cell stack in a fuel cell power system, according to an exemplary disclosed embodiment.

FIG. 2 illustrates an exemplary method 50 for controlling air flow consistent with this disclosure. As shown in the flowchart of FIG. 2, the first step in the method may include sending a control command to motor 28 (step 52) to set compressor 24 at a speed sufficient to provide a desired quantity of charged air to cathode side 20 of fuel cell stack 12.

As fuel cell stack 12 is generating electric power, controller 18 may continuously receive a signal from electric load (step 54). The signal from the electric load may be indicative of the power dissipated by electric load 14. Controller 18, based on the power dissipated by electric load 14, may then calculate a current drain value (step 55). The current drain value may be calculated using one or more equations stored in memory, and/or may be determined by, for example, referencing the configuration of fuel cell stack 12 and the fuel cell stack voltage with one or more lookup tables stored in memory. It is contemplated that in some embodiments the current drain value may be directly measured by, for example, a current sensor. Controller 18 may then determine a desired pressure drop across fuel cell stack 12 to generate the desired power output (step 56). The desired pressure drop may correspond to the desired air flow rate across fuel cell stack 12. The desired power output may correspond to the power demand by electric load 14. As with step 55, determination of the desired pressure drop may be made using one or more equations stored in memory and/or by using one or more lookup tables stored in memory.

Controller 18 may also receive signals indicative of the actual air pressure at cathode inlet 34 and actual air pressure at cathode outlet 42 based on the inlet air pressure sensor 36 and outlet air pressure sensor 44, respectively. Controller 18 may, based on the input received, then determine a measured pressure drop across the fuel cell stack 12 (step 58). It will be understood that the measured pressure drop may correspond to the actual airflow rate across fuel cell stack 12. Controller 18 may compare the measured pressure drop to the desired pressure drop to determine if there is an error between the desired and actual pressure drop values (step 60), and thus determine changes in the air flow across fuel cell stack 12. The error may reflect, for example, a change in the power demand by electric load 14.

Controller 18, in the disclosed embodiment, is a PID (Proportional Integral Derivative) type of controller, which utilizes different gain parameters to adjust an amount by which the displacement of motor 28 is varied via a control command signal. In general, the PID controller determines a feedback gain parameter (step 62), which can be computed from proportional, integrative, or derivative actions. It will be understood, however, that controller 18 can be any other known controller configured to utilize different gain parameters to adjust the amount by which the displacement of motor 28 is varied. For example, in certain embodiments, controller 18 can be a feed-back controller or any other known controller suitable for a feedback control loop. In additional and/or alternative embodiments, controller 18 can include a feed-forward controller or any other known controller suitable for a feed forward control loop.

The feedback gain parameter, in the disclosed application, generally corresponds with an amount of change that should be implemented based on an amount of error measured between desired and actual pressure drop values. Determination of the feedback gain parameter may be made using one or more equations stored in memory. Controller 18 may generate a signal that reflects the required air-flow rate based on the feedback gain parameter.

Controller 18 may further determine a feed forward gain parameter (step 64). The feed forward gain parameter, in the disclosed application, may correspond to a percentage of the maximum velocity of compressor 24 (e.g., duty) required to achieve the desired pressure drop. The feed forward gain parameter may be determined based on a magnitude of the desired pressure drop. Controller 18 may be configured to generate a signal that reflects the required air flow based on the feed forward gain parameter.

Figure 3:
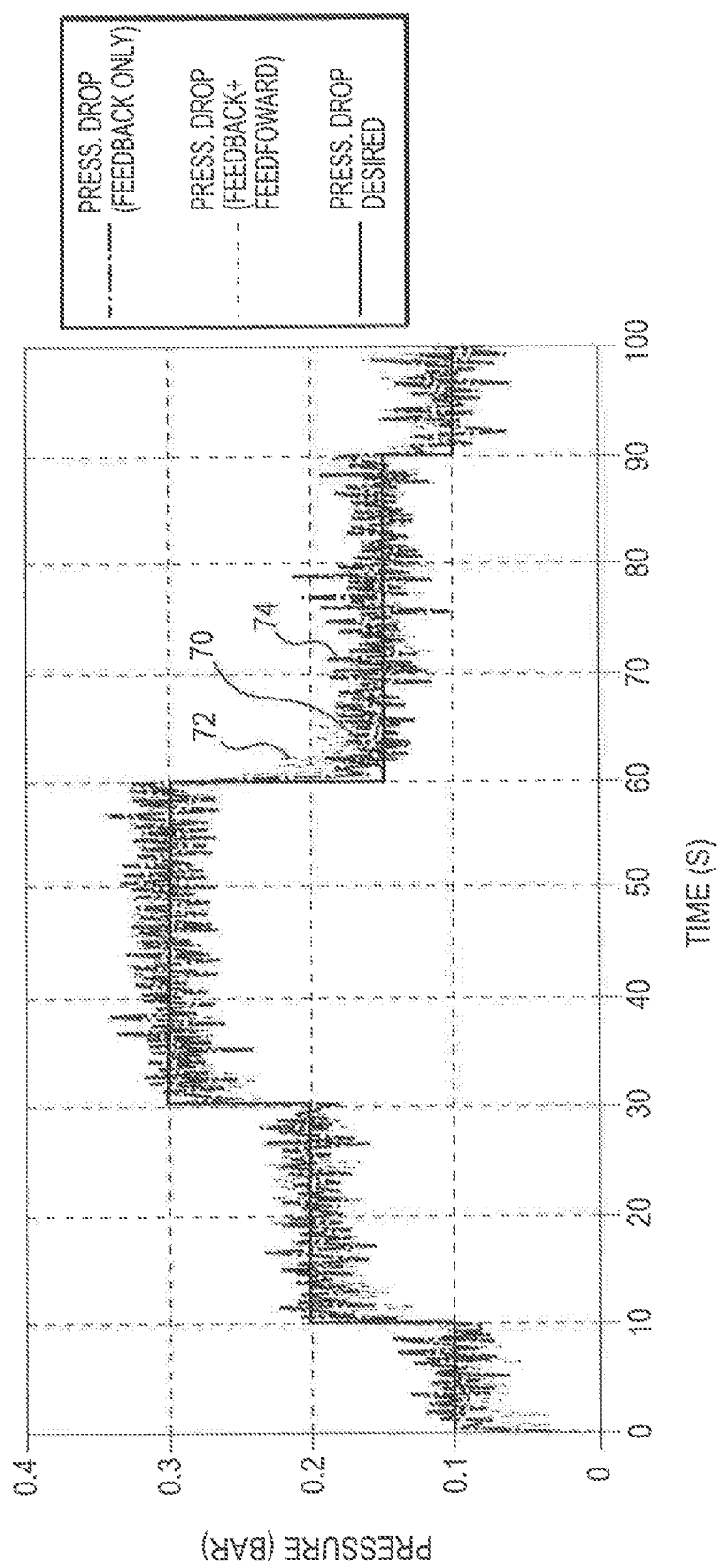
FIG. 3 is a graph comparing the desired pressure drop and the measured pressure drop in response to a stepped change in demand by an electric load.
Figure 4:
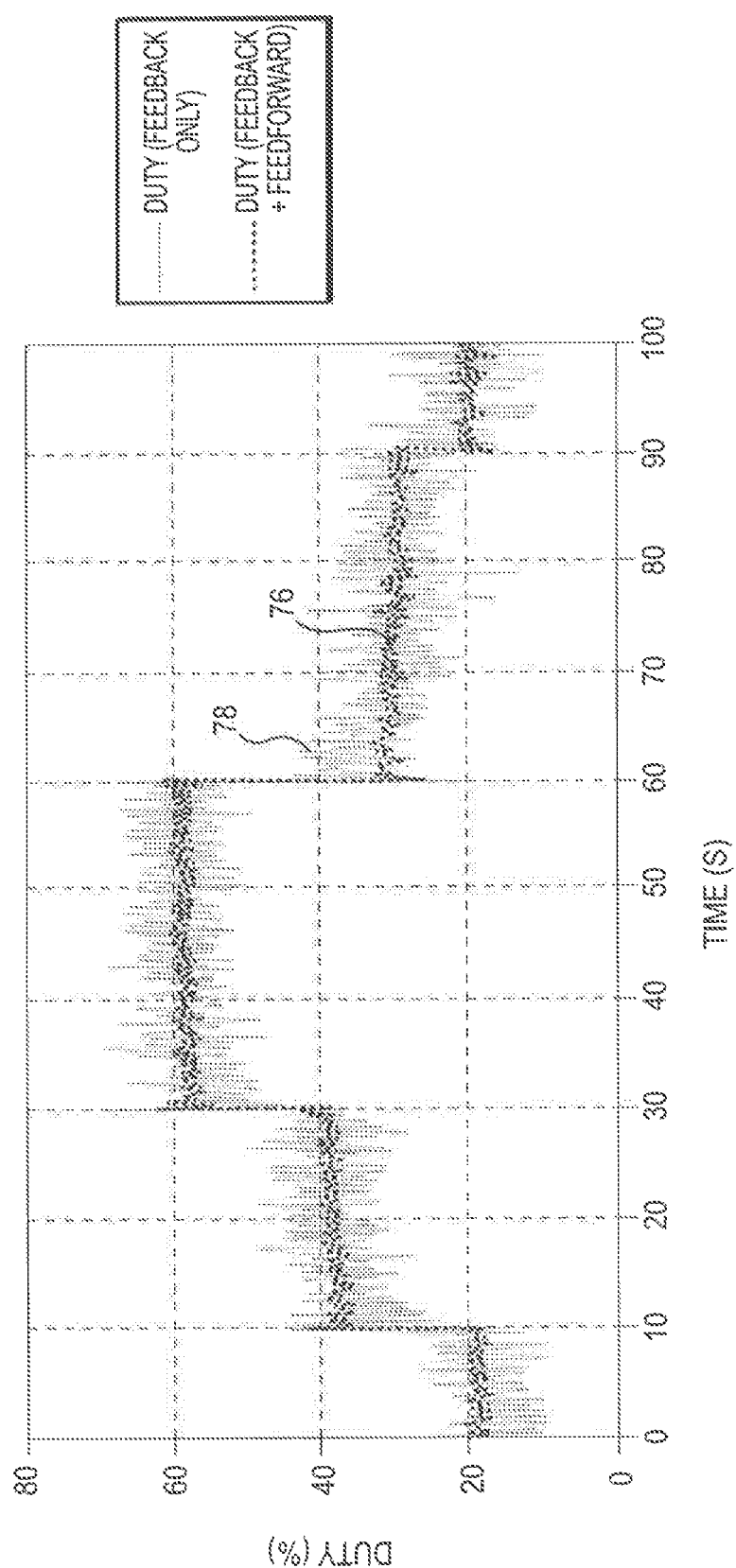
FIG. 4 is a graph illustrating the duty cycle of a motor of an air compressor in response to a stepped change in demand by an electric load.

Controller 18 may then sum the signal based on the feedback gain parameter and the signal based on the feed forward gain parameter. Other combining operations may be used as well. The control command may be adjusted to reflect the combined signal (step 66). The displacement of motor 28 maybe varied based on the adjusted control command signal which, in turn, may adjust the speed of compressor 24 (step 68). Since the signal effectively supplied to compressor 24 is a combination of the signal based on the feedback gain parameter and the signal based on the feed forward gain parameter, compressor 24 will remain stable without, for example, the excessive winding characteristics of the prior art systems. FIGS. 3 and 4 reflect this principal.

FIG. 3 is a graph that plots a desired pressure drop 70 in response to a stepped change in the demand by electric load 14. Line 72 reflects the measured pressure drop adjusted based on only the feedback gain parameter and line 74 reflects the measured pressure drop adjusted based on a combination of the feedback gain parameter and the feed forward gain parameter. As shown in FIG. 3, adjustments in the air flow rate based on a combination of the feedback gain parameter and the feed forward gain parameter reflect less noise in the measured pressure drop signal as compared to the measured pressure drop adjusted based on only the feedback gain parameter.

FIG. 4 plots the command signal to motor 28 of compressor 24 based on the feedback gain parameter only and the signal to motor 28 based on the combination of the feedback and feed forward gain parameters. As shown in FIG. 4, the combination of the signal based on the feedback and feed forward gain parameters is stable without, for example, the excessive windings present in the signal to motor 28 based on only the feedback gain parameter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fuel cell power system comprising:
   one or more fuel cells configured to generate electric power;
   a compressor configured to supply compressed air to the one or more fuel cells;
   one or more sensors associated with the one or more fuel cells and configured to (i) measure pressure of the compressed air at a cathode input of the one or more fuel cells, (ii) measure pressure of the compressed air at a cathode output of the one or more fuel cells, (iii) determine a measured pressure drop in air flowing across the one or more fuel cells based on a difference between the pressure at the cathode input of the one or more fuel cells and the cathode output of the one or more fuel cells, and (iv) generate a signal indicative of at least one measured parameter of the measured pressure drop across the one or more fuel cells; and
   a controller in communication with the one or more fuel cells, the compressor, and the one or more sensors, the controller being configured to:
   determine a desired pressure drop across the one or more fuel cells based on at least one calculated parameter;
   determine a control command for the compressor based on the desired pressure drop; and
   adjust the control command based on a feedback gain parameter, wherein the controller is further configured to determine the feedback gain parameter based on a difference between the measured pressure drop and the desired pressure drop.

2. The fuel cell power system of claim 1, wherein the controller is further configured to determine a feed forward gain parameter based on the desired pressure drop.

3. The fuel cell power system of claim 2, wherein the feed forward gain parameter corresponds to a percentage of a maximum speed of the compressor.

4. The fuel cell power system of claim 1, wherein a feed forward gain parameter is calculated based on a magnitude of the desired pressure drop.

5. The fuel cell power system of claim 1, wherein the controller is further configured to determine a feed forward gain parameter based on the desired pressure drop and adjust the control command simultaneously based on both the feedback gain parameter and the feed forward gain parameter.

6. The fuel cell power system of claim 1, wherein the one or more sensors are pressure transducers.

7. The fuel cell power system of claim 1, wherein the at least one calculated parameter is a value approximating a current output to an electrical load.

8. The fuel cell power system of claim 1, wherein the compressor has variable speed that is adjustable in response to the control command.

9. The fuel cell power system of claim 1, wherein the control command is directed to a motor of the air compressor.

10. The fuel cell power system of claim 1, wherein each of the one or more fuel cells include an anode and a cathode, wherein the compressor is configured to provide compressed air to the cathode of each of the one or more fuel cells, wherein hydrogen gas is provided to the anode of each of the one or more fuel cells, and wherein the compressed air of the cathodes and the hydrogen gas of the anodes react to produce an electrical power output.

* * * * *